United States Patent
Isomura et al.

(10) Patent No.: US 10,112,628 B2
(45) Date of Patent: Oct. 30, 2018

(54) ANTI-ROLLING DEVICE OF RAILCAR

(71) Applicant: KAWASAKI JUKOGYO KABUSHIKI KAISHA, Hyogo (JP)

(72) Inventors: Kazuo Isomura, Kobe (JP); Takanori Tojo, Kobe (JP); Masahiro Sakahira, Kobe (JP); Jun Shirasaki, Kobe (JP); Tomohide Maeba, Kobe (JP); Naoki Hikosaka, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 197 days.

(21) Appl. No.: 15/307,432

(22) PCT Filed: Mar. 2, 2015

(86) PCT No.: PCT/JP2015/001078
§ 371 (c)(1),
(2) Date: Oct. 28, 2016

(87) PCT Pub. No.: WO2015/166618
PCT Pub. Date: Nov. 5, 2015

(65) Prior Publication Data
US 2017/0050650 A1    Feb. 23, 2017

(30) Foreign Application Priority Data
Apr. 28, 2014    (JP) .................................. 2014-092678

(51) Int. Cl.
*B61F 5/24*    (2006.01)
*B61F 3/02*    (2006.01)
(Continued)

(52) U.S. Cl.
CPC ................ *B61F 5/24* (2013.01); *B61F 3/02* (2013.01); *B61F 5/10* (2013.01); *F16C 17/10* (2013.01);
(Continued)

(58) Field of Classification Search
CPC .......... B61F 5/24; F16C 33/74; F16C 2326/10
(Continued)

(56) References Cited

U.S. PATENT DOCUMENTS 8,640,630 B2 *  2/2014  Gilmartin ................ B61F 5/24
                                                        105/199.2
9,180,895 B2 * 11/2015  Hojak ...................... B61F 5/24
(Continued)

FOREIGN PATENT DOCUMENTS

JP         2013-510753 A        3/2013

OTHER PUBLICATIONS

Written Opinion issued in PCT/JP2015/001078; dated May 26, 2015.
(Continued)

*Primary Examiner* — Zachary L Kuhfuss
(74) *Attorney, Agent, or Firm* — Studebaker & Brackett PC

(57) ABSTRACT

A first bearing casing accommodates a first spherical bearing while restricting a displacement of the first spherical bearing in an axial direction, and a second bearing casing accommodates a second spherical bearing while allowing a displacement of the second spherical bearing in the axial direction. The second bearing casing includes a protruding portion interposed between each of second oil sealing members and the second spherical bearing so as to be spaced apart from the second spherical bearing in the axial direction.

4 Claims, 14 Drawing Sheets

(51) Int. Cl.
*B61F 5/10* (2006.01)
*F16C 17/10* (2006.01)
*F16C 33/74* (2006.01)
*F16J 15/3224* (2016.01)
*F16C 23/04* (2006.01)

(52) U.S. Cl.
CPC ............ *F16C 23/045* (2013.01); *F16C 33/74* (2013.01); *F16J 15/3224* (2013.01); *F16C 2326/10* (2013.01)

(58) Field of Classification Search
USPC ...................................................... 105/199.2
See application file for complete search history.

(56) References Cited

U.S. PATENT DOCUMENTS

| | | | | |
|---|---|---|---|---|
| 9,932,050 | B2* | 4/2018 | Sato | B61F 5/22 |
| 2010/0239197 | A1* | 9/2010 | Hojak | B61F 5/24 |
| | | | | 384/147 |
| 2012/0304888 | A1* | 12/2012 | Gilmartin | B61F 5/24 |
| | | | | 105/199.2 |
| 2015/0114252 | A1* | 4/2015 | Sato | B61F 5/38 |
| | | | | 105/199.1 |
| 2016/0068171 | A1* | 3/2016 | Karner | B61F 5/24 |
| | | | | 105/172 |
| 2017/0050650 | A1* | 2/2017 | Isomura | B61F 5/24 |
| 2018/0162418 | A1* | 6/2018 | Sato | B61F 5/38 |
| 2018/0162419 | A1* | 6/2018 | Sato | B61F 5/22 |

OTHER PUBLICATIONS

International Preliminary Report on Patentability of the International Searching Authority; PCT/JP2015/001078; dated Nov. 1, 2016.

International Search Report issued in PCT/JP2015/001078; dated May 26, 2015.

* cited by examiner

FIXED END

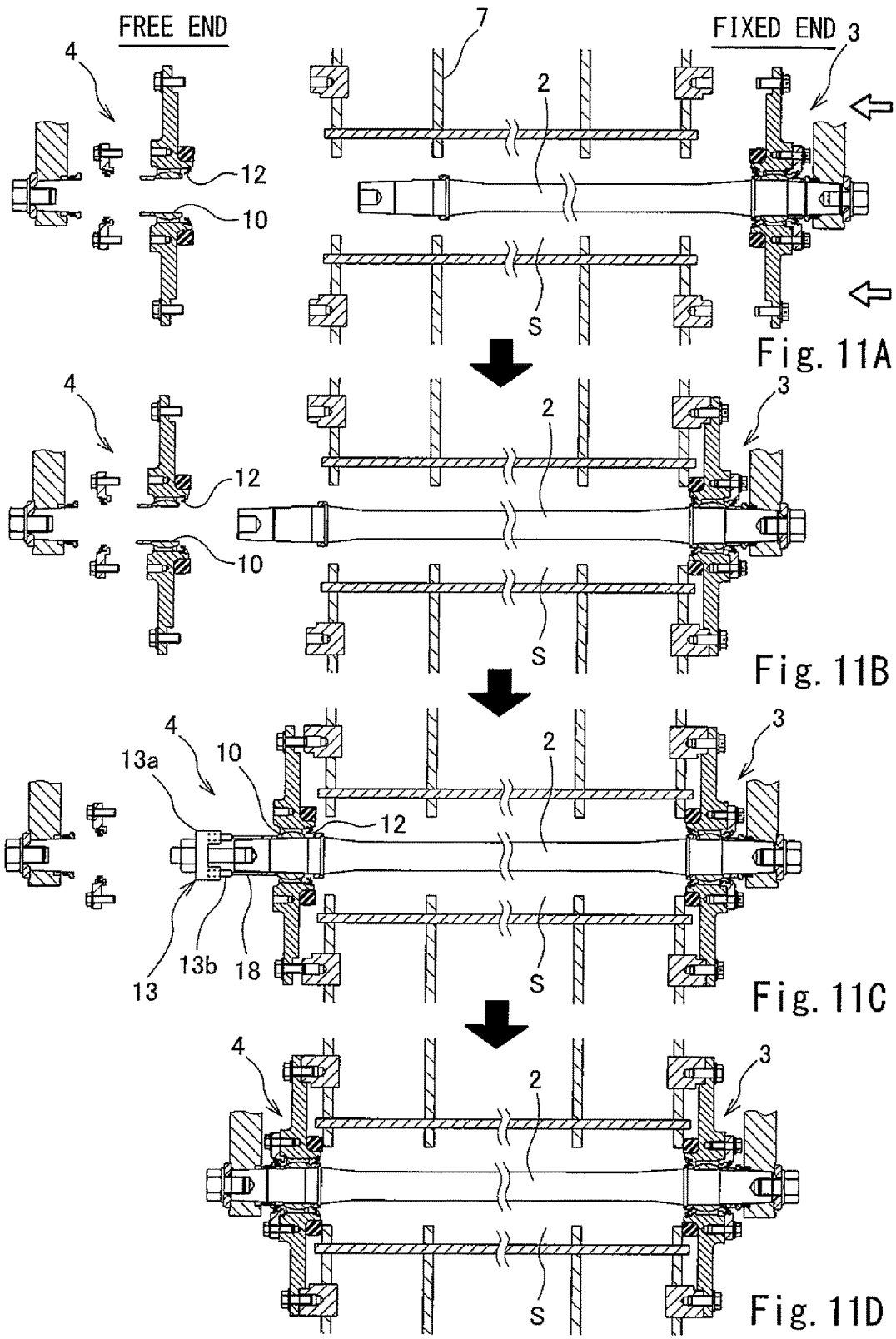

ANTI-ROLLING DEVICE OF RAILCAR

TECHNICAL FIELD

The present invention relates to an anti-rolling device of a railcar.

BACKGROUND ART

In some of railcars, to suppress vertical vibrations applied to passengers, an air spring is interposed between a carbody and a bogie. When a spring constant of the air spring is reduced, a vibrationproof effect increases. However, rolling of the carbody easily occurs, and the posture of the carbody becomes unstable. Therefore, a car may include an anti-rolling device that suppresses the rolling of the carbody (see PTL 1, for example). According to the anti-rolling device, typically, a torsion bar extending in a car width direction is supported by a bogie through bearings, and both end portions of the torsion bar are coupled to a carbody. When the rolling of the carbody relative to the bogie occurs, torsional force acts on the torsion bar, and the rolling of the carbody is suppressed by restoring force of the torsion bar, the restoring force being generated by the torsional force. It should be noted that a different type of anti-rolling device is configured such that: the torsion bar extending in the car width direction is supported by the carbody through the bearings; and both end portions of the torsion bar are coupled to the bogie.

CITATION LIST

Patent Literature

PTL 1: Published Japanese Translation of PCT International Application No. 2013-510753

SUMMARY OF INVENTION

Technical Problem

The anti-rolling device may be configured such that in consideration of assembly errors, deflection of the torsion bar, and the like, the bearing at one side in an axial direction is fixed in the axial direction as a fixed end, and the bearing at the other side in the axial direction is not fixed in the axial direction as a free end, so that a change in an axial distance between the bearings is allowed. For example, as shown in FIG. 9, an anti-rolling device 1 includes: a torsion bar 2 inserted into an internal space S extending in a width direction of a bogie frame 7; a first bearing device 3 supporting a first end portion of the torsion bar 2; a second bearing device 4 supporting a second end portion of the torsion bar 2; a first link mechanism 5 configured to couple the first end portion of the torsion bar 2 to the carbody; and a second link mechanism 6 configured to couple the second end portion of the torsion bar 2 to the carbody.

In the first bearing device 3, a first bearing 8 is in contact in the axial direction with and sandwiched between a pair of protruding portions 9a and 9b projecting toward a radially inner side from a first bearing casing 9 fixed to a first side of the bogie frame 7. To be specific, the pair of protruding portions 9a and 9b of the first bearing casing 9 accommodate the first bearing 8 while restricting a displacement of the first bearing 8 in the axial direction. Thus, the first bearing 8 serves as the fixed end. On the other hand, in the second bearing device 4, gaps are provided at both sides of a second bearing 10 in the axial direction, and a displacement of the second bearing 10 in the axial direction is not restricted by a second bearing casing 11 fixed to a second side of the bogie frame 7. To be specific, the second bearing casing 11 accommodates the second bearing 10 while allowing the displacement of the second bearing 10 in the axial direction. Thus, the second bearing 10 serves as the free end.

When attaching the anti-rolling device 1 to the bogie frame 7, the torsion bar 2 needs to be inserted into the internal space S of the bogie frame 7 in the axial direction. However, a direction in which the torsion bar 2 is moved is restricted in terms of work. Specifically, as shown in FIGS. 10A and 10B, when performing attaching work of inserting the torsion bar 2, to which the second bearing device 4 is attached, into the internal space S of the bogie frame 7 from the free end side, the second bearing 10 press-contacting and fitted to the torsion bar 2 is movable in the second bearing casing 11 together with the torsion bar 2 toward a second oil sealing member 12 located at an axially inner side. Therefore, the second bearing 10 may strongly contact the second oil sealing member 12 by axial inertial force of the heavy torsion bar 2, and the second oil sealing member 12 may be damaged.

On the other hand, as shown in FIGS. 11A to 11D, when performing attaching work of inserting the torsion bar 2, to which the first bearing device 3 is attached, into the internal space S of the bogie frame 7 from the fixed end side, the second oil sealing member 12 is not damaged. For example, in a step shown in FIG. 11C, the second bearing 10 is press-fitted to between the torsion bar 2 and the second bearing casing 11 by using a center-hole type hydraulic jack 13 and a pipe-shaped jig 18. To be specific, a base portion 13a of the hydraulic jack 13 is fixed to a second end of the torsion bar 2 in such a manner that a bolt is inserted into a center hole of the hydraulic jack 13 to be fixed to a screw hole of the torsion bar 2. Then, the jig 18 contacting the second bearing 10 pushes the second bearing 10 inward in the axial direction by a piston portion 13b of the hydraulic jack 13. With this, the second bearing 10 is press-fitted to the torsion bar 2. Thus, the second bearing 10 moves toward the second oil sealing member 12. However, by appropriately setting the amount of displacement of the piston portion 13b, the second bearing 10 does not contact the second oil sealing member 12. Therefore, when attaching the anti-rolling device 1 to the bogie frame 7, the damage of the second oil sealing member 12 needs to be avoided by performing the attaching work of inserting the torsion bar 2, to which the first bearing device 3 is attached, into the internal space S of the bogie frame 7 from the fixed end side.

In addition, when detaching the anti-rolling device 1 from the bogie frame 7, the direction in which the torsion bar 2 is moved is restricted in terms of work. Specifically, when performing detaching work of pulling out the torsion bar 2 toward the fixed end side, the second bearing device 4 is fixed to the second side of the bogie frame 7 so as to close the internal space S of the bogie frame 7 from an outside in the width direction, so that an operator cannot access the second bearing 10 and the like from an inside in the car width direction. Therefore, as shown in FIGS. 12A to 12C, in a state where a base portion 16a of a hydraulic jack 16 is fixed to the second bearing casing 11, the torsion bar 2 needs to be pushed by a piston portion 16b of the hydraulic jack 16 from an outside in the car width direction to be pulled out from the fixed end side. However, the second bearing 10 press-fitted to the torsion bar 2 moves inward in the axial direction in the second bearing casing 11 in accordance with the inward movement of the torsion bar 2 in the axial direction until the press-fitting of the second bearing 10 to the torsion bar 2 is canceled. Therefore, the second bearing 10 may strongly contact the second oil sealing member 12 to damage the second oil sealing member 12.

On the other hand, as shown in FIGS. 13A to 13C, when performing detaching work of pulling out the torsion bar 2 from the free end side, the second oil sealing member 12 is not damaged. For example, in a step shown in FIG. 13B, the torsion bar 2 is pushed by the hydraulic jack 16 inward in the axial direction from the fixed end side to be pulled out from the free end side. At this time, the second bearing 10 press-fitted to the torsion bar 2 moves in a direction away from the second oil sealing member 12, so that the second bearing 10 does not contact the second oil sealing member 12. Then, the first bearing casing 9 accommodates the first bearing 8 while restricting the displacement of the first bearing 8 in the axial direction. Therefore, the first bearing 8 does not contact a first oil sealing member 17. On this account, when detaching the anti-rolling device 1 from the bogie frame 7, the damage of the second oil sealing member 12 needs to be avoided by pulling out the torsion bar 2 from the free end side.

As above, when the first bearing 8 provided at the first side of the torsion bar 2 serves as the fixed end, and the second bearing 10 provided at the second side of the torsion bar 2 serves as the free end in the anti-rolling device 1 in which the torsion bar 2 is attached or detached through the internal space S of the bogie frame 7, both the direction of the attaching work and the direction of the detaching work are restricted, and this deteriorates work efficiency.

As shown in FIG. 14, a train set 14 can travel toward both sides in the car longitudinal direction. Therefore, in a plan view, a plurality of bogies 15A to 15D are typically changed in direction and arranged so as to be point-symmetrical when viewed from a center of the entire train set 14. Therefore, to maintaining the point symmetry when applying the same anti-rolling devices 1 to the respective bogies 15A to 15D, both the fixed ends and the free ends exist at one side in the width direction of the car. However, the direction of the attaching work and the direction of the detaching work are restricted in the anti-rolling device 1. Therefore, to allow the operator to perform the same work at one side in the width direction of the car with respect to all the plurality of bogies 15A to 15D, all the anti-rolling devices 1 of the bogies 15A to 15D are arranged such that the free ends thereof are collectively positioned at one side in the width direction of the car. In this case, the anti-rolling devices 1 are not arranged so as to be point-symmetrical when viewed from the center of the entire railcar 14 in a plan view, and the bogies 15A to 15D that are different in type from one another are managed. To be specific, although bogie main bodies other than the anti-rolling devices are arranged so as to be point-symmetrical, the free ends of the anti-rolling devices 1 are arranged at one side. Therefore, assembly types of the bogies increase. Thus, maintenances of the bogies are inconvenient, and a railway operator needs to have, operate, and manage plural types of bogies.

Here, an object of the present invention is to, even when the torsion bar is inserted into the internal space formed at a fixed portion of the bogie or carbody, and one of the bearings is not positioned in the axial direction, prevent the damage of the oil sealing member in the work of attaching or detaching the anti-rolling device and prevent the direction of the attaching work and the direction of the detaching work from being restricted.

Solution to Problem

An anti-rolling device of a railcar according to one aspect of the present invention includes: a torsion bar extending in a width direction of a carbody and including both end portions coupled through respective levers to a first attachment target that is one of the carbody or a bogie, the torsion bar being inserted in the width direction into an internal space formed at a second attachment target that is the other of the carbody and the bogie; a first bearing device including a first bearing casing provided at a first end side of the torsion bar and fixed to a portion of the second attachment target, the portion being located at an outer side in the width direction, a first bearing accommodated in the first bearing casing and rotatably supporting a first end-side supported portion of the torsion bar, and a pair of first oil sealing members arranged so as to be spaced apart from the first bearing in an axial direction; and a second bearing device including a second bearing casing provided at a second end side of the torsion bar and fixed to a portion of the first attachment target, the portion being located at the outer side in the width direction, a second bearing accommodated in the second bearing casing and rotatably supporting a second end-side supported portion of the torsion bar, and a pair of second oil sealing members arranged so as to be spaced apart from the second bearing in the axial direction, wherein: the first bearing device and the second bearing device are fixed to the fixed portion so as to close the internal space of the fixed portion from the width direction; the first bearing casing accommodates the first bearing while restricting a displacement of the first bearing in the axial direction; the second bearing casing accommodates the second bearing while allowing a displacement of the second bearing in the axial direction; and the second bearing casing includes a protruding portion interposed between each of the pair of second oil sealing members and the second bearing so as to be spaced apart from the second bearing in the axial direction.

According to the above configuration, even when large relative displacements of the second bearing and the pair of second oil sealing members occur in the work of attaching or detaching the anti-rolling device to or from a fixed portion of the bogie or carbody by moving the torsion bar in the axial direction through the internal space of the fixed portion, the protruding portion interposed between each of the pair of second oil sealing members and the second bearing receives the second bearing to prevent the second bearing from contacting the second oil sealing member. Therefore, even when the second bearing casing does not position the second bearing in the axial direction for the purpose of allowing relative displacements of the first bearing and the second bearing in the axial direction by deflection of the torsion bar and the like, the second oil sealing members are suitably prevented from being damaged in the work of attaching and detaching the torsion bar. On this account, the direction of the work of attaching and detaching the anti-rolling device can be prevented from being restricted.

Advantageous Effects of Invention

As is clear from the above explanation, according to the present invention, even when the torsion bar is inserted into the internal space formed at the bogie or the carbody, and the second bearing casing does not position the second bearing in the axial direction, the second oil sealing members can be suitably prevented from being damaged in the work of attaching and detaching the torsion bar, and the direction of the attaching work and the direction of the detaching work can be prevented from being restricted.

BRIEF DESCRIPTION OF DRAWINGS

FIGS. 11A to 11D are cross-sectional views for explaining the work of attaching the anti-rolling device of the bogie of FIG. 9 from the fixed end side.

DESCRIPTION OF EMBODIMENTS

Hereinafter, embodiments will be explained in reference to the drawings. In the following explanation, a direction in which a railcar travels, that is, a direction in which a carbody extends is defined as a car longitudinal direction, and a crosswise direction orthogonal to the car longitudinal direction is defined as a width direction. It should be noted that the car longitudinal direction may also be referred to as a forward/rearward direction, and the width direction may also be referred to as a leftward/rightward direction.

Embodiment 1

Figure 1:
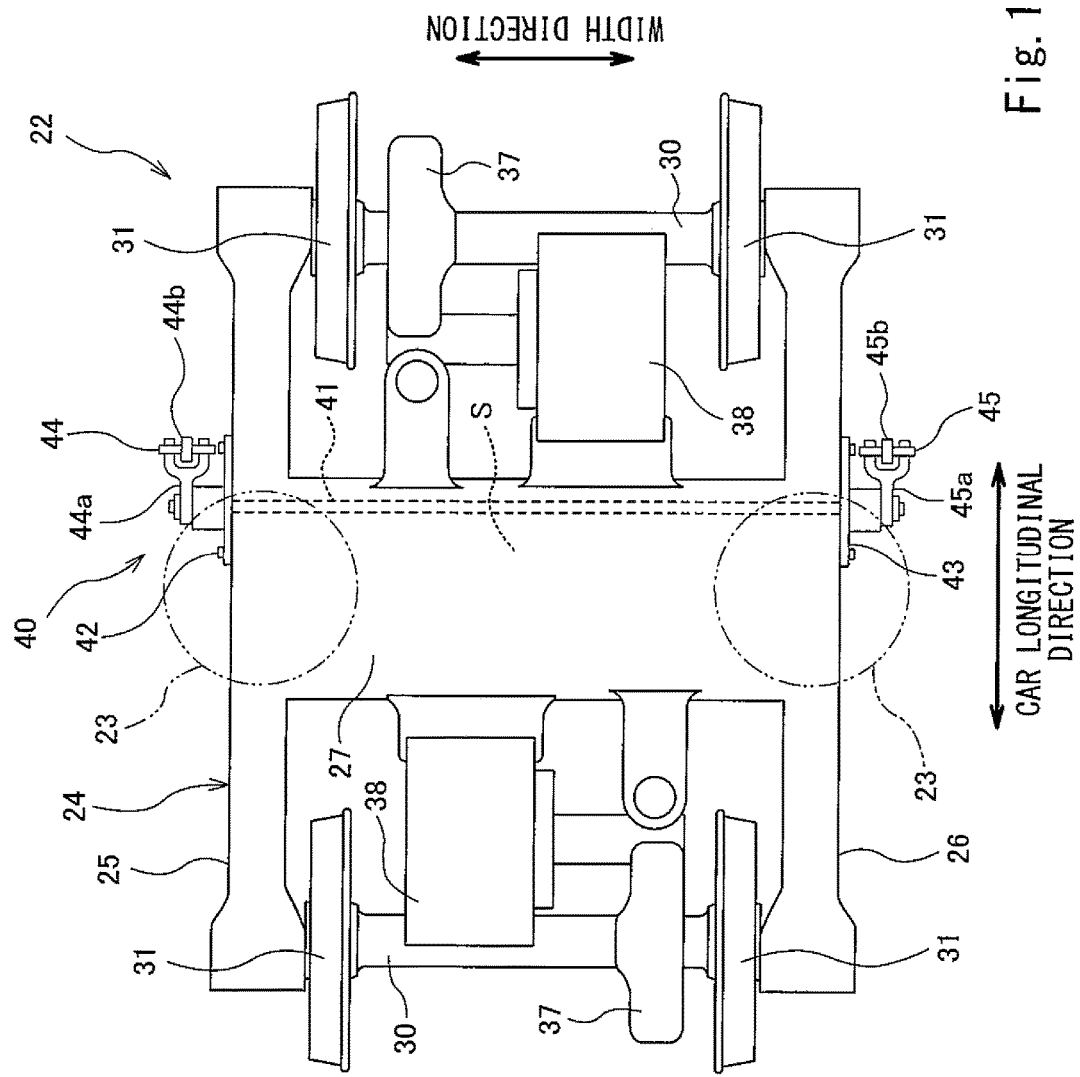
FIG. 1 is a plan view showing a railcar bogie equipped with an anti-rolling device according to Embodiment 1.
Figure 2:
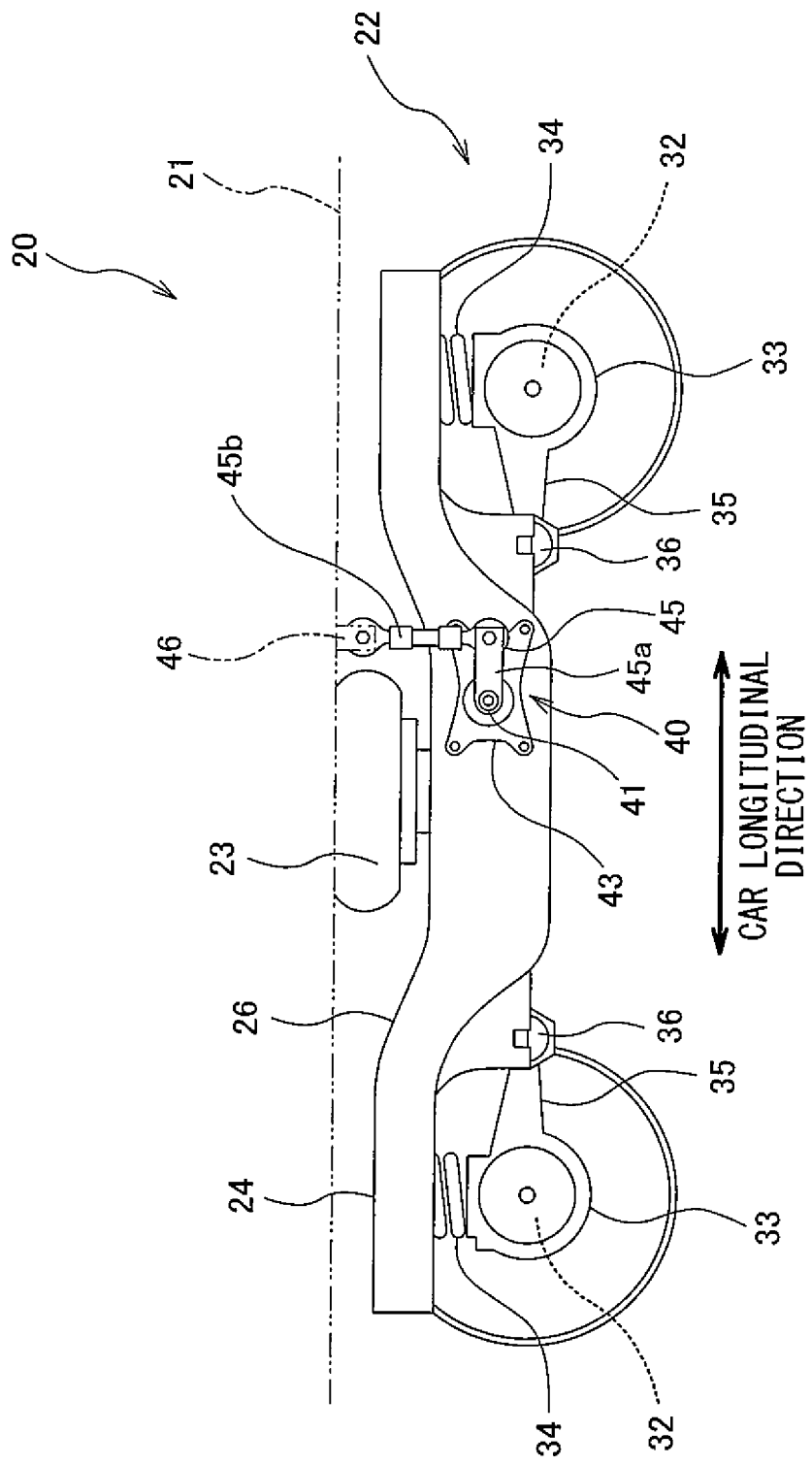
FIG. 2 is a side view showing the bogie of FIG. 1.

FIG. 1 is a plan view showing a railcar bogie 22 equipped with an anti-rolling device 40 according to Embodiment 1. FIG. 2 is a side view showing the bogie 22 of FIG. 1. As shown in FIGS. 1 and 2, a railcar 20 that is a train set includes: a carbody 21 including a passenger room on which passengers get; and the bogie 22 supporting the carbody 21 from below. The bogie 22 includes a bogie frame 24 supporting the carbody 21 through air springs 23. The bogie frame 24 includes: a pair of side sills 25 and 26 located at both respective sides in the width direction and extending in the car longitudinal direction; and a cross beam 27 extending in the width direction so as to couple car longitudinal direction middle portions of the pair of side sills 25 and 26 to each other.

An axle 30 extending in the width direction and wheels 31 provided at both respective end portions of the axle 30 are provided at each of both car longitudinal direction sides of the cross beam 27. Both end portions of the axle 30 are rotatably supported by bearings 32. The bearings 32 are accommodated in respective axle boxes 33. An axle box suspension 34 including a coil spring (axle spring) is interposed between each of both car longitudinal direction portions of each of the side sills 25 and 26 and the corresponding axle box 33. An axle beam 35 extends from each of the axle boxes 33 toward a center of the bogie. An end portion of the axle beam 35 is elastically coupled to the side sill 25 or 26 through a rubber bushing 36 and the like. A reducer 37 attached to the bogie frame 24 through a damper and the like is connected to the axle 30. An electric motor 38 fixed to the bogie frame 24 is connected to the reducer 37.

The anti-rolling device 40 is interposed between the carbody 21 and the bogie 22. The anti-rolling device 40 includes a torsion bar 41, a first bearing device 42, a second bearing device 43, a first link mechanism 44, and a second link mechanism 45. The torsion bar 41 extends in the width direction of the carbody 21 and is inserted into an internal space S in the width direction, the internal space S being formed at the bogie frame 24 (fixed portion) of the bogie 22 (second attachment target) and extending in the width direction. Both first and second end portions 41a and 41b of the torsion bar 41 are coupled to the carbody 21 (first attachment target) through the first link mechanism 44 and the second link mechanism 45, respectively. Specifically, the torsion bar 41 is inserted into the internal space S surrounded by the box-shaped cross beam 27 and the side sills 25 and 26 and is arranged at a position displaced from a center of the bogie 22 toward one side in the car longitudinal direction.

The first bearing device 42 supports a first axial end portion of the torsion bar 41 and is fixed to a first width-direction side surface of the bogie frame 24. The second bearing device 43 supports a second axial end portion of the torsion bar 41 and is fixed to a second width-direction side surface of the bogie frame 24. The first link mechanism 44 includes: a horizontal lever 44a including a first end portion coupled to the first axial end portion of the torsion bar 41 so as to rotate together with the torsion bar 41; and a vertical lever 44b including a lower end portion coupled to a second end portion of the horizontal lever 44a so as to be rotatable. An upper end portion of the vertical lever 44b is rotatably coupled to a bracket (not shown) provided at a lower portion of a first width-direction side of the carbody 21. The second link mechanism 45 includes: a horizontal lever 45a including a first end portion coupled to the second axial end portion of the torsion bar 41 so as to rotate together with the torsion bar 41; and a vertical lever 45b including a lower end portion coupled to a second end portion of the horizontal lever 45a so as to be rotatable. An upper end portion of the vertical lever 45b is rotatably coupled to a bracket 46 provided at a lower portion of a second width-direction side of the carbody 21.

Figure 3:
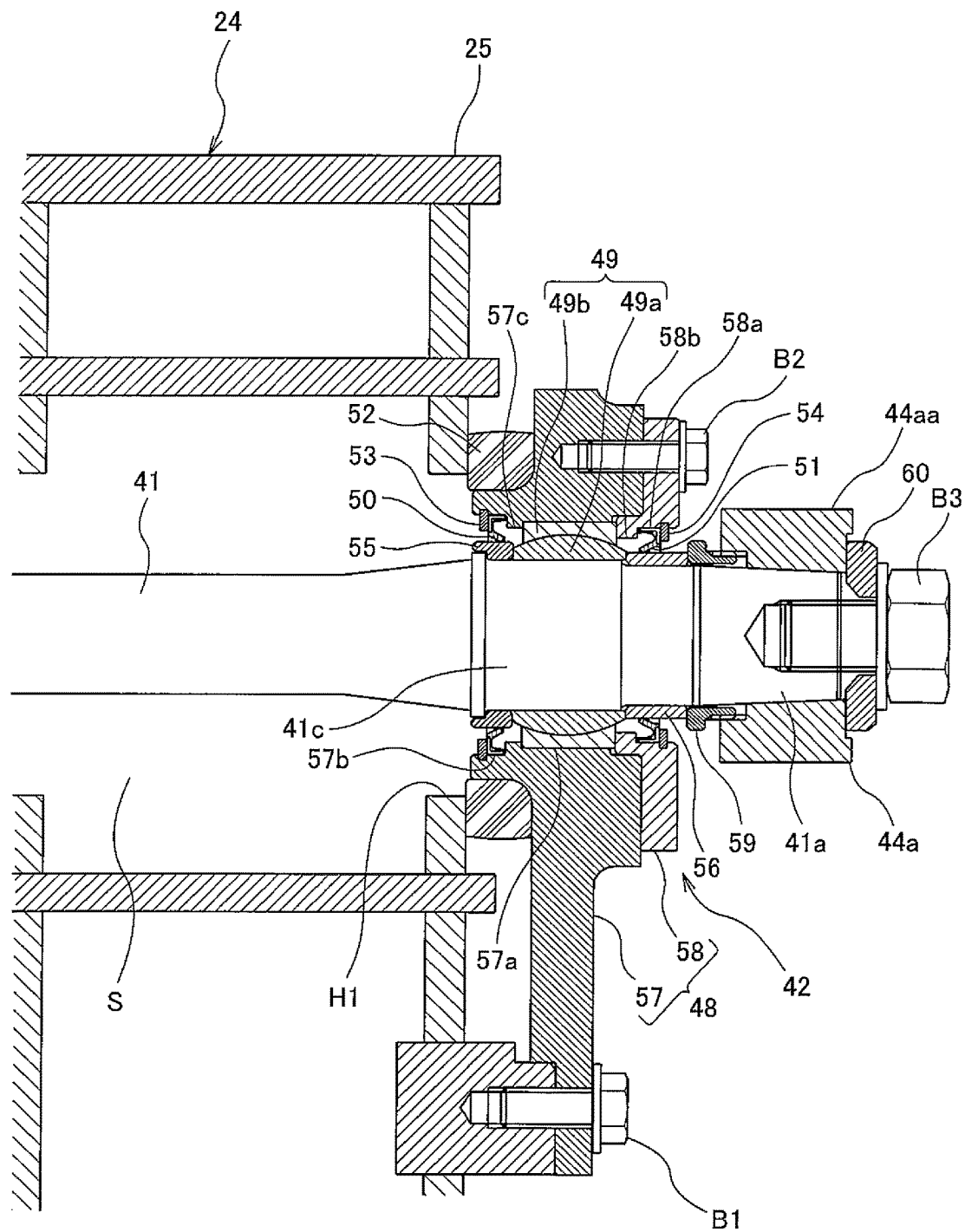
FIG. 3 is an enlarged cross-sectional view showing a fixed end side of the anti-rolling device of the bogie of FIG. 1.

FIG. 3 is an enlarged cross-sectional view showing a fixed end side of the anti-rolling device 40 of the bogie 22 of FIG. 1. As shown in FIG. 3, a through hole H1 communicating with the internal space S of the bogie frame 24 is formed on a first width-direction side wall (outer side wall of the side sill 25) of the bogie frame 24, and the torsion bar 41 is inserted into the internal space S through the through hole H1. The first bearing device 42 includes a first bearing casing 48, a first spherical bearing 49, a pair of first oil sealing members 50 and 51, a packing 52, a pair of snap rings 53 and 54, and a pair of spacers 55 and 56.

The first bearing casing 48 includes: a casing main body 57 fixed to the first width-direction side surface of the bogie frame 24 by a bolt B1; and a cover 58 fixed to an axially outer side of the casing main body 57 by a bolt B2. The casing main body 57 includes: a small-diameter inner peripheral surface 57a slidably contacting an outer peripheral surface of an outer ring 49b of the first spherical bearing 49; a large-diameter inner peripheral surface 57b contacting a radially outer end portion of an annular first oil sealing member 50 provided at an axially inner side; and an annular protruding portion 57c projecting toward a radially inner side from the small-diameter inner peripheral surface 57a and located at an end portion of the small-diameter inner peripheral surface 57a, the end portion being close to the large-diameter inner peripheral surface 57b. The protruding portion 57c contacts an axially inner side surface of the outer ring 49b of the first spherical bearing 49.

The snap ring 53 is engaged with the large-diameter inner peripheral surface 57b of the casing main body 57, the snap ring 53 supporting the first oil sealing member 50 from the axially inner side, the first oil sealing member 50 being provided at the axially inner side. The spacer 55 contacting a radially inner end portion of the first oil sealing member 50 is fitted to the torsion bar 41. The first spherical bearing 49 includes: an inner ring 49a including a spherical outer peripheral surface projecting toward a radially outer side; and the outer ring 49b including a spherical inner peripheral surface depressed toward the radially outer side. The inner ring 49a is press-fitted to a supported portion 41c of the torsion bar 41 and contacts a side surface of the spacer 55. The outer peripheral surface of the inner ring 49a and the inner peripheral surface of the outer ring 49b are slidably fitted to each other through an oil film.

The cover 58 includes: an inner peripheral surface 58a contacting a radially outer end portion of the first oil sealing member 51 provided at the axially outer side; and an annular protruding portion 58b located at the axially outer side of the inner peripheral surface 58a and projecting toward the radially inner side beyond the inner peripheral surface 58a. The protruding portion 58b contacts an axially outer side surface of the outer ring 49b of the first spherical bearing 49. To be specific, the outer ring 49b of the first spherical bearing 49 is sandwiched by the pair of protruding portions 57c and 58b of the first bearing casing 48 from both sides in an axial direction to be positioned and fixed in the axial direction. With this, the first spherical bearing 49 serves as the fixed end in the axial direction.

The snap ring 54 is engaged with the inner peripheral surface 58a of the cover 58, the snap ring 54 supporting the annular first oil sealing member 51 from the axially outer side, the annular first oil sealing member 51 being provided at the axially outer side. The spacer 56 contacting a radially inner end portion of the first oil sealing member 51 is fitted to the torsion bar 41. The pair of spacers 55 and 56 sandwich the inner ring 49a of the first spherical bearing 49 from both sides in the axial direction. The annular packing 52 is sandwiched between an outer side surface of the bogie frame 24 and an inner side surface of the casing main body 57, the outer side surface being located around the through hole H1. To be specific, the first bearing device 42 closes the through hole H1 of the bogie frame 24 from the axially outer side. With this, the first bearing device 42 is fixed to the bogie frame 24 so as to close the internal space S of the bogie frame 24 from the width direction.

An end portion 44aa of the horizontal lever 44a is fitted to the first end portion 41a of the torsion bar 41. The end portion 44aa of the horizontal lever 44a is coupled to the first end portion 41a of the torsion bar 41 so as to rotate together with the torsion bar 41. A spacer 59 is further interposed between the end portion 44aa of the horizontal lever 44a and the spacer 56. An annular plate 60 contacting an axially outer end surface of the end portion 44aa of the horizontal lever 44a is fitted to the first end portion 41a of the torsion bar 41. A bolt B3 that retains the annular plate 60 is fastened to a first end surface of the torsion bar 41.

Figure 4:
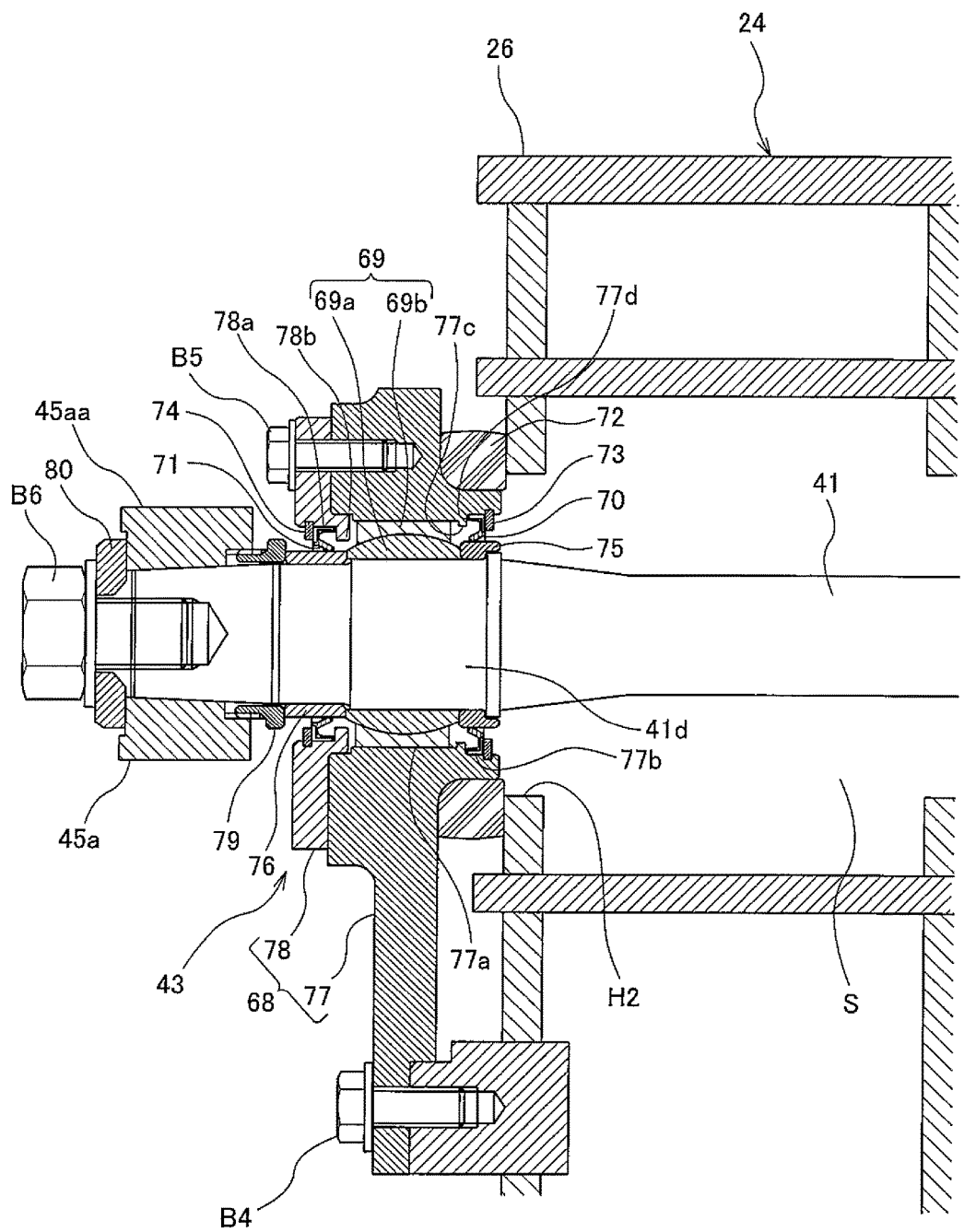
FIG. 4 is an enlarged cross-sectional view showing a free end side of the anti-rolling device of the bogie of FIG. 1.

FIG. 4 is an enlarged cross-sectional view showing a free end side of the anti-rolling device 40 of the bogie 22 of FIG. 1. As shown in FIG. 4, a through hole H2 communicating with the internal space S of the bogie frame 24 is formed on a second width-direction side wall (outer side wall of the side sill 26) of the bogie frame 24, and the torsion bar 41 is inserted into the internal space S through the through hole H2. The second bearing device 43 includes a second bearing casing 68, a second spherical bearing 69, a pair of second oil sealing members 70 and 71, a packing 72, a pair of snap rings 73 and 74, and a pair of spacers 75 and 76.

The second bearing casing 68 includes: a casing main body 77 fixed to the second width-direction side surface of the bogie frame 24 by a bolt B4; and a cover 78 fixed to the axially outer side of the casing main body 77 by a bolt B5. The casing main body 77 includes: a small-diameter inner peripheral surface 77a slidably contacting an outer peripheral surface of an outer ring 69b of the second spherical bearing 69; a large-diameter inner peripheral surface 77b contacting a radially outer end portion of an annular second oil sealing member 70 provided at the axially inner side; and an annular protruding portion 77c projecting toward the radially inner side from the small-diameter inner peripheral surface 77a and located at an end portion of the small-diameter inner peripheral surface 77a, the end portion being close to the large-diameter inner peripheral surface 77b.

The radially outer end portion of the second oil sealing member 70 is located at the radially outer side of the outer ring 69b of the second spherical bearing 69. The second oil sealing member 70 contacts a side surface 77d of the casing main body 77, the side surface 77d being located at the radially outer side of the small-diameter inner peripheral surface 77a. The second oil sealing member 70 is supported by the side surface 77d from the axially outer side. To be specific, the radially outer end portion of the second oil sealing member 70 is supported by the side surface 77d from the axially outer side, the side surface 77d connecting the small-diameter inner peripheral surface 77a and the large-diameter inner peripheral surface 77b in a radial direction. The protruding portion 77c is spaced apart from the outer ring 69b of the second spherical bearing 69 in the axial direction and does not contact the second spherical bearing 69. The protruding portion 77c is also spaced apart from the second oil sealing member 70 provided at the axially inner side and does not contact the second oil sealing member 70.

The snap ring 73 is engaged with the large-diameter inner peripheral surface 77b of the casing main body 77, the snap ring 73 supporting the second oil sealing member 70 from the axially inner side, the second oil sealing member 70 being provided at the axially inner side. The spacer 75 contacting a radially inner end portion of the second oil sealing member 70 is fitted to the torsion bar 41. The second spherical bearing 69 includes: an inner ring 69a including a spherical outer peripheral surface projecting toward the radially outer side; and the outer ring 69b including a spherical inner peripheral surface depressed toward the radially outer side. The inner ring 69a is press-fitted to a supported portion 41d of the torsion bar 41 and contacts a side surface of the spacer 75. The outer peripheral surface of the inner ring 69a and the inner peripheral surface of the outer ring 69b are slidably fitted to each other through an oil film.

The cover 78 includes: an inner peripheral surface 78a contacting a radially outer end portion of the second oil sealing member 71 provided at the axially outer side; and an annular protruding portion 78b located at the axially outer side of the inner peripheral surface 78a and projecting toward the radially inner side beyond the inner peripheral surface 78a. The protruding portion 78b contacts the second oil sealing member 71 provided at the axially outer side and supports the second oil sealing member 71 from the axially inner side. The protruding portion 78b is spaced apart from the outer ring 69b of the second spherical bearing 69 in the axial direction and does not contact the second spherical bearing 69.

To be specific, the outer ring 69b of the second spherical bearing 69 is spaced apart from the pair of protruding portions 77c and 78b of the second bearing casing 68 in the axial direction, and the second bearing casing 68 accommodates the second spherical bearing 69 while allowing a displacement of the second spherical bearing 69 in the axial direction. As above, the second spherical bearing 69 is not positioned in the axial direction by the second bearing casing 68 and serves as the free end in the axial direction.

The snap ring 74 that supports the annular second oil sealing member 71, provided at the axially outer side, from the axially outer side is engaged with the inner peripheral surface 78a of the cover 78. The spacer 76 contacting a radially inner end portion of the second oil sealing member 71 is fitted to the torsion bar 41. The pair of spacers 75 and 76 sandwich the inner ring 69a of the second spherical bearing 69 from both sides in the axial direction. The annular packing 72 is sandwiched between an outer side surface, located around the through hole H2, of the bogie frame 24 and an inner side surface of the casing main body 77. To be specific, the second bearing device 43 closes the through hole H2 of the bogie frame 24 from the axially outer side. With this, the second bearing device 43 is fixed to the bogie frame 24 so as to close the internal space S of the bogie frame 24 from the width direction.

An end portion 45aa of the horizontal lever 45a is fitted to the second end portion 41b of the torsion bar 41. The end portion 45aa of the horizontal lever 45a is coupled to the second end portion 41b of the torsion bar 41 so as to rotate together with the torsion bar 41. A spacer 79 is further interposed between the end portion 45aa of the horizontal lever 45a and the spacer 76. An annular plate 80 contacting an axially outer end surface of the end portion 45aa of the horizontal lever 45a is fitted to the second end portion 41b of the torsion bar 41. A bolt B6 that retains the annular plate 80 is fastened to a second end surface of the torsion bar 41.

Figure 5A:
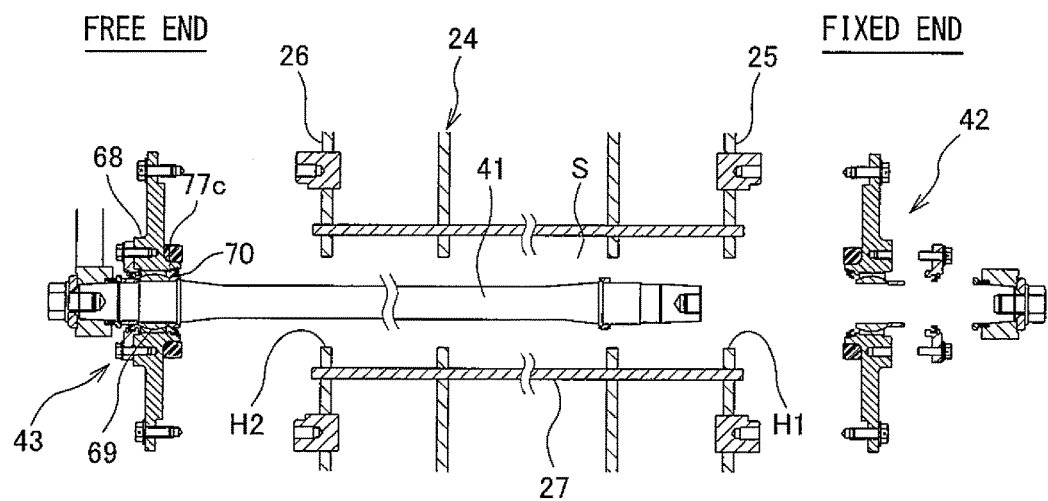
FIGS. 5A and 5B are cross-sectional views for explaining work of attaching the anti-rolling device of the bogie of FIG. 1 from the free end side.
Figure 5B:
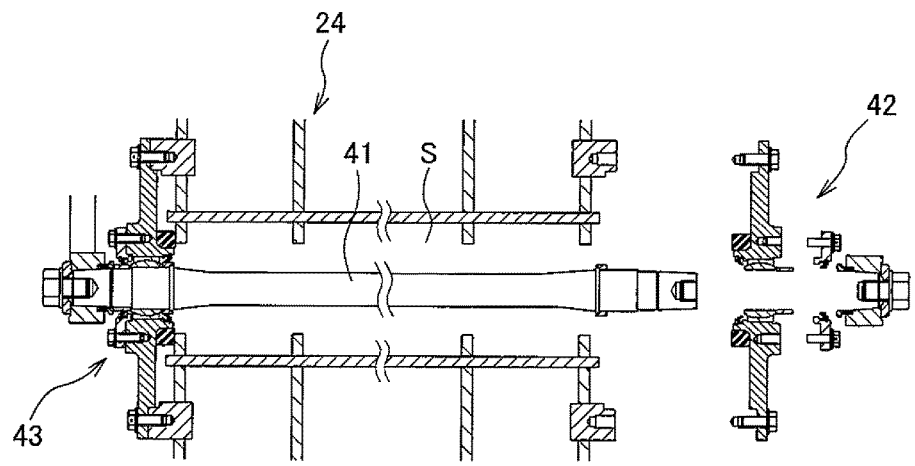

FIGS. 5A and 5B are cross-sectional views for explaining work of attaching the anti-rolling device 40 of the bogie 22 of FIG. 1 from the free end side. As shown in FIGS. 5A and 5B, when performing attaching work of inserting the torsion bar 41, to which the second bearing device 43 is attached, into the internal space S of the bogie frame 24 from the free end side, the second spherical bearing 69 press-fitted to the torsion bar 41 may move in the second bearing casing 68 together with the torsion bar 41 toward the second oil sealing member 70 located at the axially inner side. However, even when the second spherical bearing 69 moves toward the second oil sealing member 70, the outer ring 69b of the second spherical bearing 69 is received by the protruding portion 77c of the second bearing casing 68. To be specific, the contact of the outer ring 69b of the second spherical bearing 69 with the second oil sealing member 70 by axial inertial force of the heavy torsion bar 41 is prevented by the protruding portion 77c. Thus, the second oil sealing member 70 is prevented from being damaged. Therefore, the anti-rolling device 40 can be attached to the bogie 22 from the free end side.

Further, when performing attaching work of inserting the torsion bar 41 into the internal space S of the bogie frame 24 from the fixed end side, as with the example shown in FIGS. 11A to 11D, the second oil sealing member 70 is not damaged, the first bearing device 42 being attached to the torsion bar 41. Therefore, attaching the anti-rolling device 40 to the bogie 22 from the fixed end side is possible. On this account, the attaching work of the anti-rolling device 40 can be performed from both the fixed end side and the free end side, and the direction of the attaching work is not restricted.

Figure 6A:
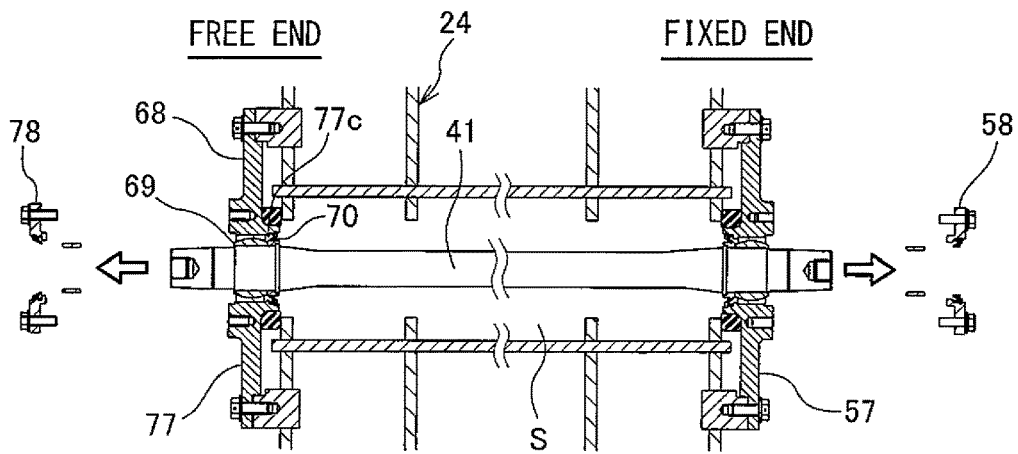
FIGS. 6A to 6C are cross-sectional views for explaining work of detaching the anti-rolling device of the bogie of FIG. 1 from the fixed end side.
Figure 6B:
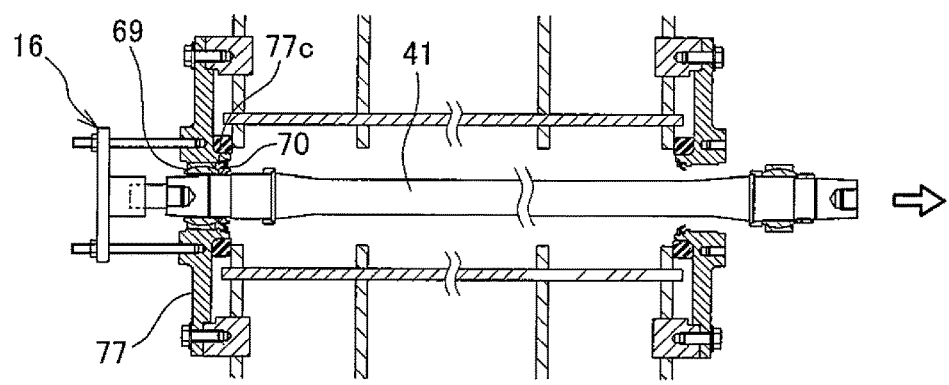
Figure 6C:
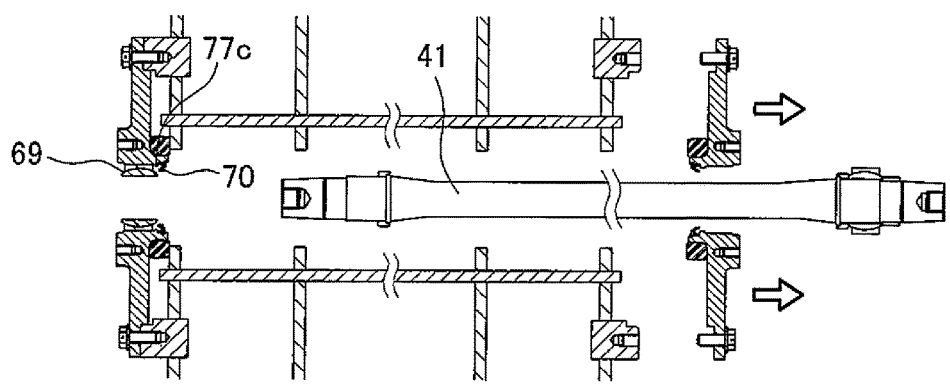

FIGS. 6A to 6C are cross-sectional views for explaining work of detaching the anti-rolling device 40 of the bogie 22 of FIG. 1 from the fixed end side. As shown in FIGS. 6A to 6C, when performing work of detaching the anti-rolling device 40 of the bogie 22 from the fixed end side, the torsion bar 41 is pushed by the hydraulic jack 16 from a car width direction outer side toward the fixed end side to be detached. At this time, since the torsion bar 41 is press-fitted to the inner ring 69a of the second spherical bearing 69, the second spherical bearing 69 moves toward the second oil sealing member 70 in accordance with the movement of the torsion bar 41 in the axial direction until the torsion bar 41 is pulled out from the second spherical bearing 69. However, even when the second spherical bearing 69 moves toward the second oil sealing member 70, the outer ring 69b of the second spherical bearing 69 is received by the protruding portion 77c of the second bearing casing 68. To be specific, the contact of the outer ring 69b of the second spherical bearing 69 with the second oil sealing member 70 by hydraulic pressure of the hydraulic jack 16 is prevented by the protruding portion 77c. Thus, the second oil sealing member 70 is prevented from being damaged. Therefore, the anti-rolling device 40 of the bogie 22 can be detached from the fixed end side.

Figure 13A:
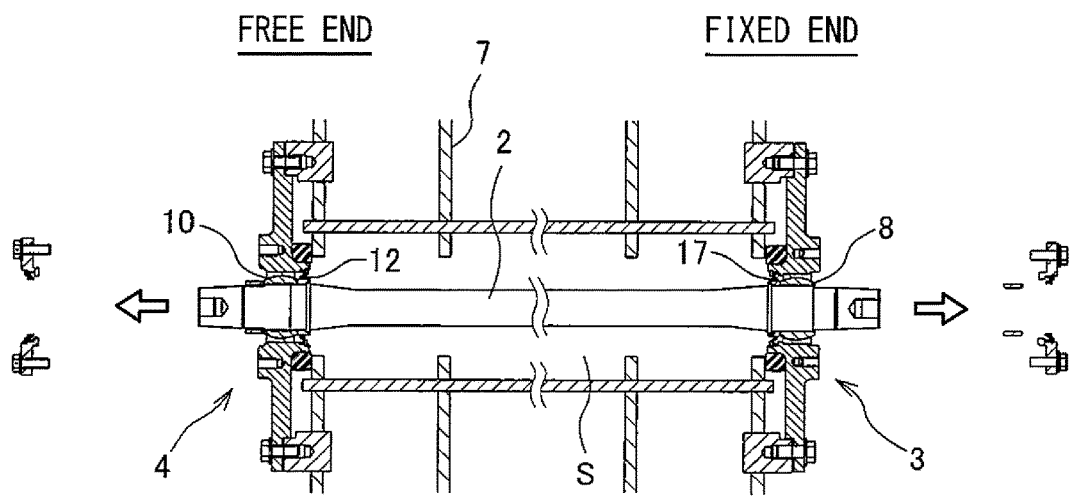
FIGS. 13A to 13C are cross-sectional views for explaining the work of detaching the anti-rolling device of the bogie of FIG. 9 from the free end side.
Figure 13B:
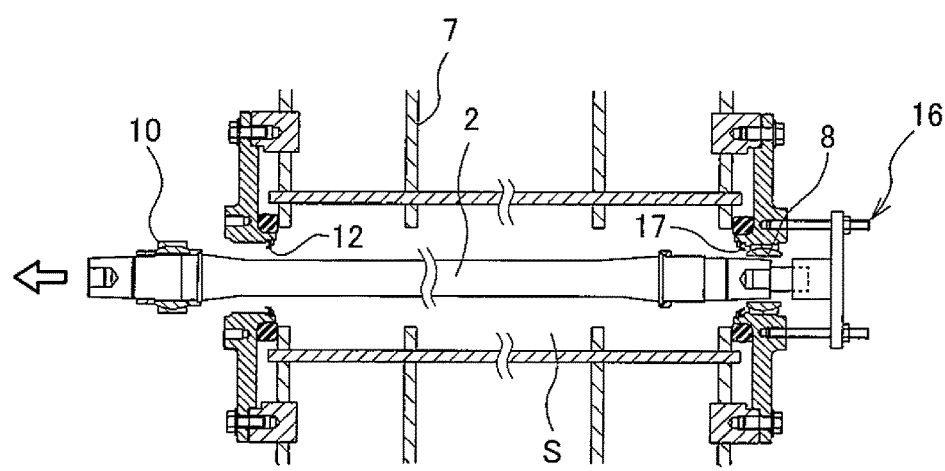
Figure 13C:
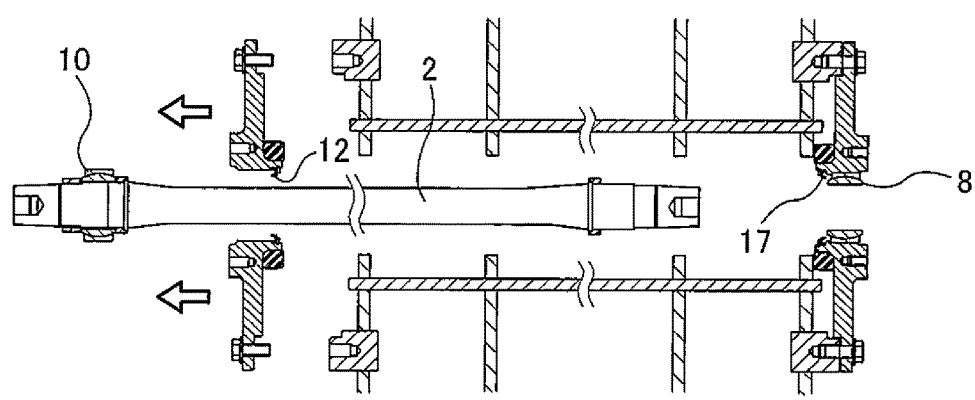
Figure 14:
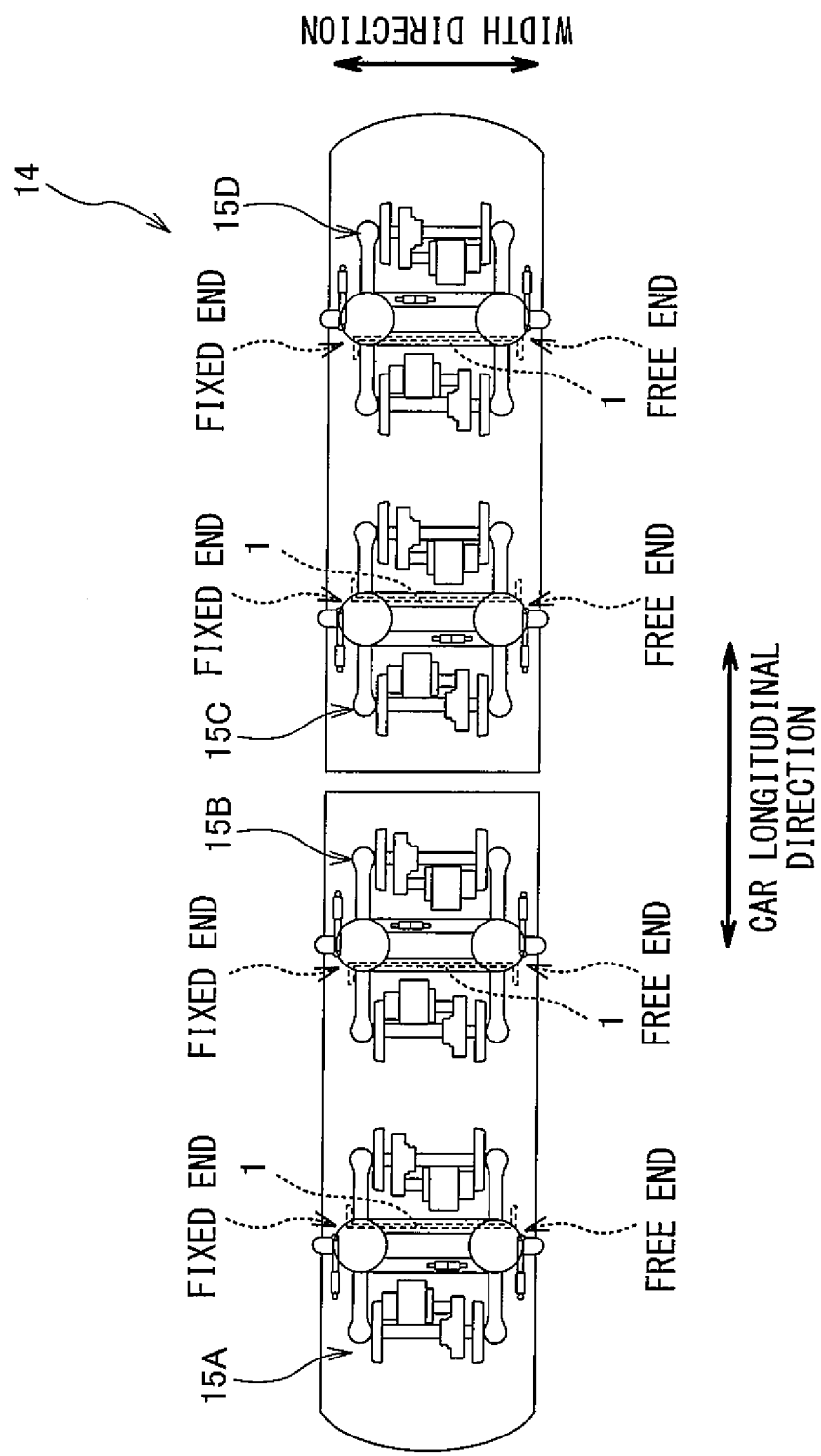
FIG. 14 is a plan view schematically showing the railcar including a plurality of bogies each equipped with the anti-rolling device of FIG. 9.

Further, when performing work of detaching the anti-rolling device 40 by pulling out the torsion bar 41 toward the free end side, as with the example shown in FIG. 13A to 13B, the second oil sealing member 70 is not damaged. Therefore, detaching the anti-rolling device 40 of the bogie 22 from the free end side is possible. On this account, the detaching work of the anti-rolling device 40 can be performed from both the fixed end side and the free end side, and the direction of the detaching work is not restricted.

According to the above-explained configuration, even when the second spherical bearing 69 largely moves in the axial direction in the work of attaching or detaching the anti-rolling device 40 by moving the torsion bar 41 in the axial direction through the internal space S of the bogie frame 24 of the bogie 22, the protruding portion 77c or 78b interposed between the second spherical bearing 69 and the second oil sealing member 70 or 71 receives the outer ring 69b of the second spherical bearing 69 to prevent the second spherical bearing 69 from contacting the second oil sealing member 70 or 71.

Specifically, the radially outer end portion of the second oil sealing member 70 is located at the radially outer side of the outer ring 69b of the second spherical bearing 69 and contacts the large-diameter inner peripheral surface 77b of the second bearing casing 68. Therefore, for the purpose of positioning the second oil sealing member 70 in the axial direction, it is sufficient to provide the side surface 77d facing the end portion of the second oil sealing member 70 at the radially outer side of the small-diameter inner peripheral surface 77a in the second bearing casing 68. However, the protruding portion 77c located at a portion, close to the large-diameter inner peripheral surface 77b, of the small-diameter inner peripheral surface 77a and projecting toward the radially inner side from the small-diameter inner peripheral surface 77a is intentionally provided at the second bearing casing 68. Therefore, even when the second spherical bearing 69 largely moves in the axial direction, the protruding portion 77c achieves the purpose of preventing the second spherical bearing 69 from contacting the second oil sealing member 70.

Thus, even when the second bearing casing 68 does not position the second spherical bearing 69 in the axial direction for the purpose of allowing relative displacements of the first spherical bearing 49 and the second spherical bearing 69 in the axial direction by deflection of the torsion bar 41 and the like, the second oil sealing members 70 and 71 are prevented from being damaged in the work of attaching and detaching the torsion bar 41. On this account, both the direction of the work of attaching the anti-rolling device 40 and the direction of the work of detaching the anti-rolling device 40 can be prevented from being restricted.

Figure 7:
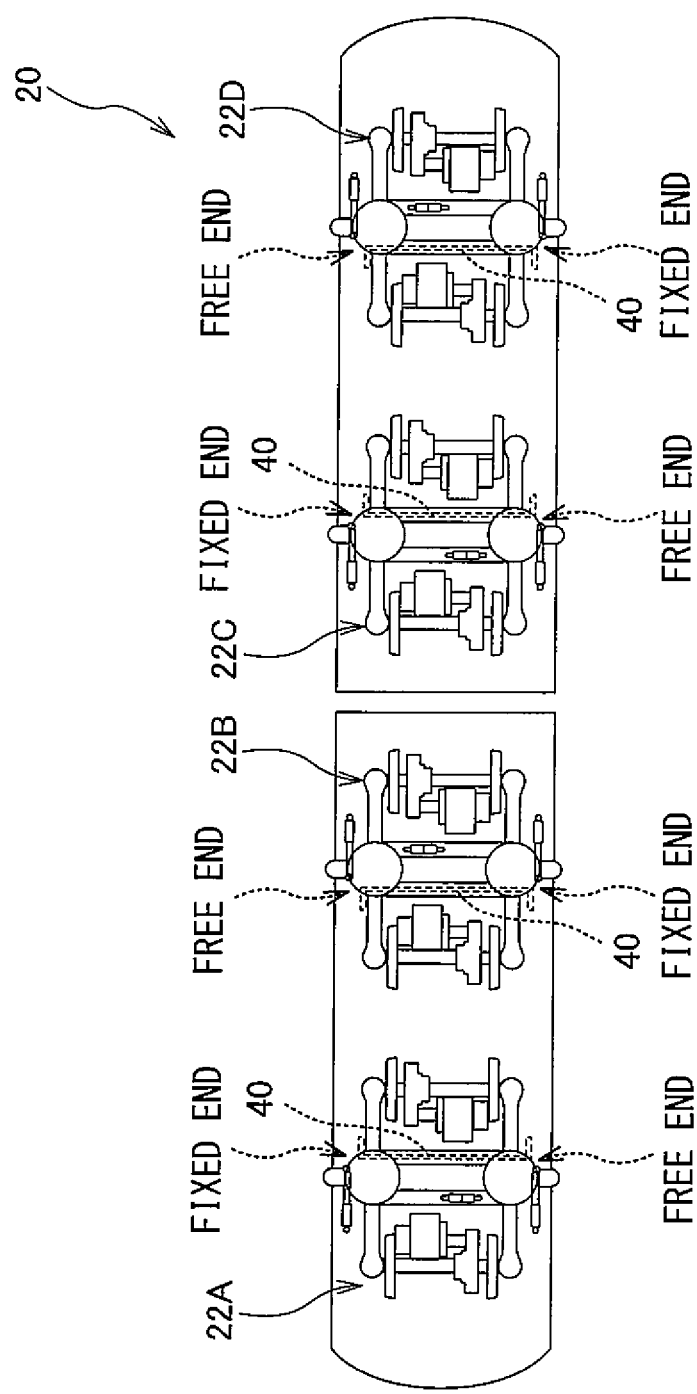
FIG. 7 is a plan view schematically showing a railcar including a plurality of bogies each equipped with the anti-rolling device of FIG. 1.

FIG. 7 is a plan view schematically showing a train set 20 including a plurality of bogies 22A to 22D each equipped with the anti-rolling device 40 of FIG. 1. As shown in FIG. 7, in the train set 20, the plurality of bogies 22A to 22D are arranged so as to be point-symmetrical when viewed from a center of the entire train set 20 in a plan view. This can be realized since the direction of the work of attaching the anti-rolling device 40 and the direction of the work of detaching the anti-rolling device 40 are not restricted. To be specific, the free ends of the anti-rolling devices 40 of the bogies 22A and 22C are arranged at one side in the car width direction, and the free ends of the anti-rolling devices 40 of the bogies 22B and 22D are arranged at the other side in the car width direction. Since the bogies 22A to 22D are arranged so as to be point-symmetrical as above, the types of the bogies 22A and 22D can be made identical to each other, and the types of the bogies 22B and 22C can be made identical to each other. Even in this case, an operator can perform the work of attaching or detaching the anti-rolling devices 40 to or from the bogies 22A to 22D at one side in the width direction of the car. Therefore, the assembly types of the bogies 22A to 22D can be reduced while satisfactorily maintaining the ease of work of attaching and detaching the anti-rolling devices 40 in the train set 20.

It should be noted that the above bogie 22 is a bolsterless bogie but may be a bogie with a bolster. When the bogie with the bolster is equipped with the anti-rolling device 40, a portion into which the torsion bar 41 is inserted may be not the bogie frame 24 but the bolster.

Embodiment 2

Figure 8:
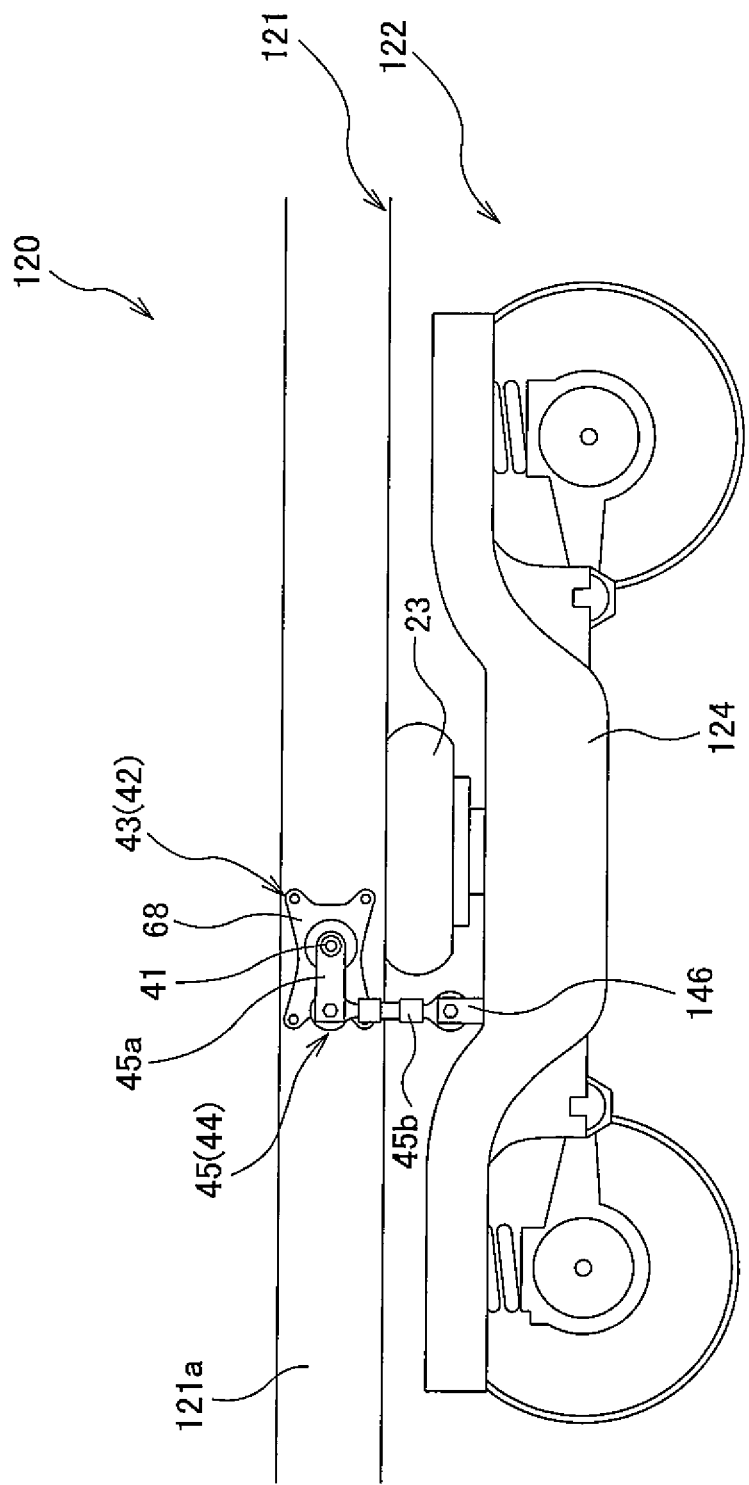
FIG. 8 is a major component side view schematically showing the railcar equipped with the anti-rolling device according to Embodiment 2.
Figure 9:
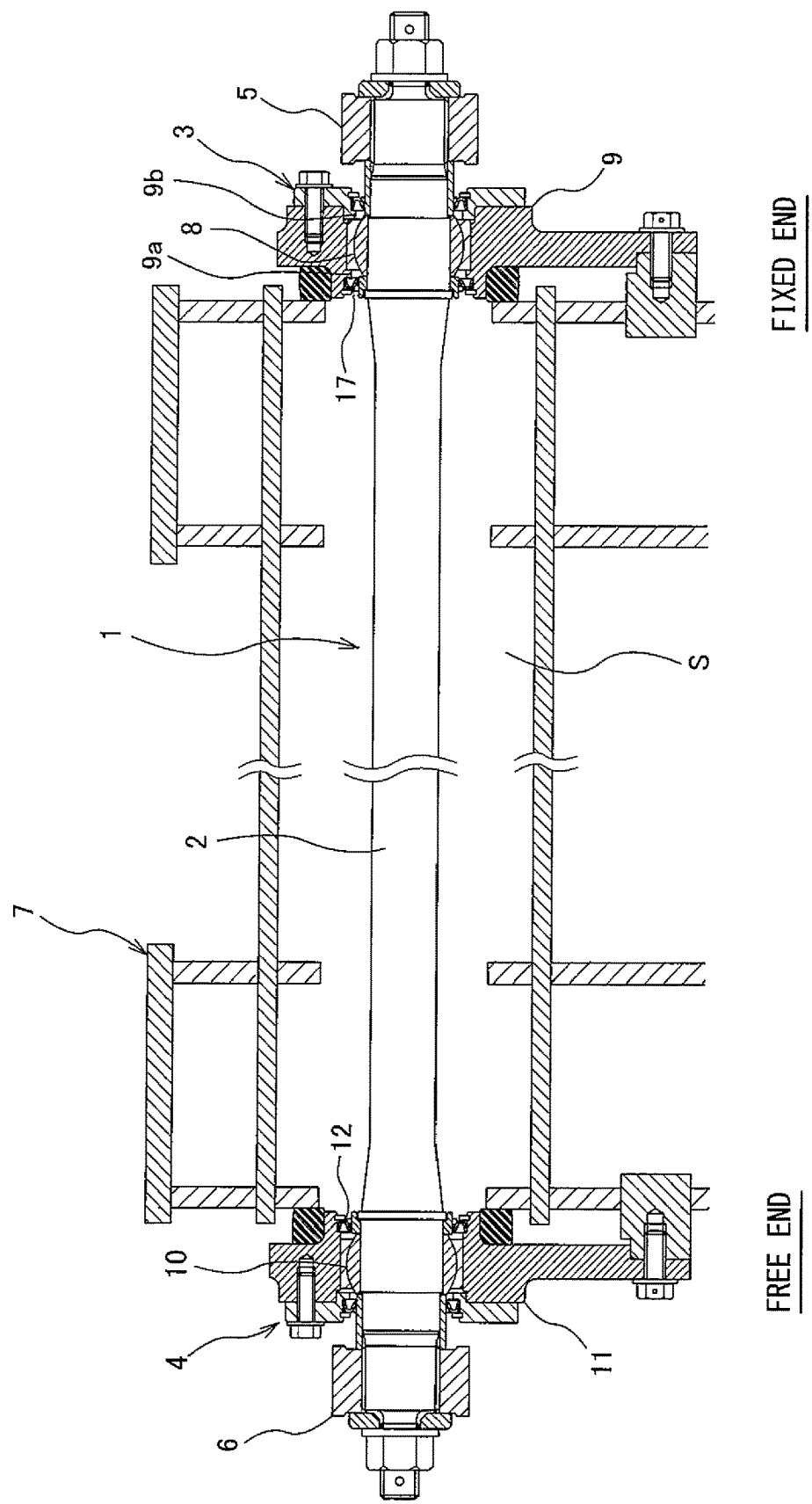
FIG. 9 is a cross-sectional view showing the anti-rolling device of the railcar according to Reference Example.
Figure 10A:
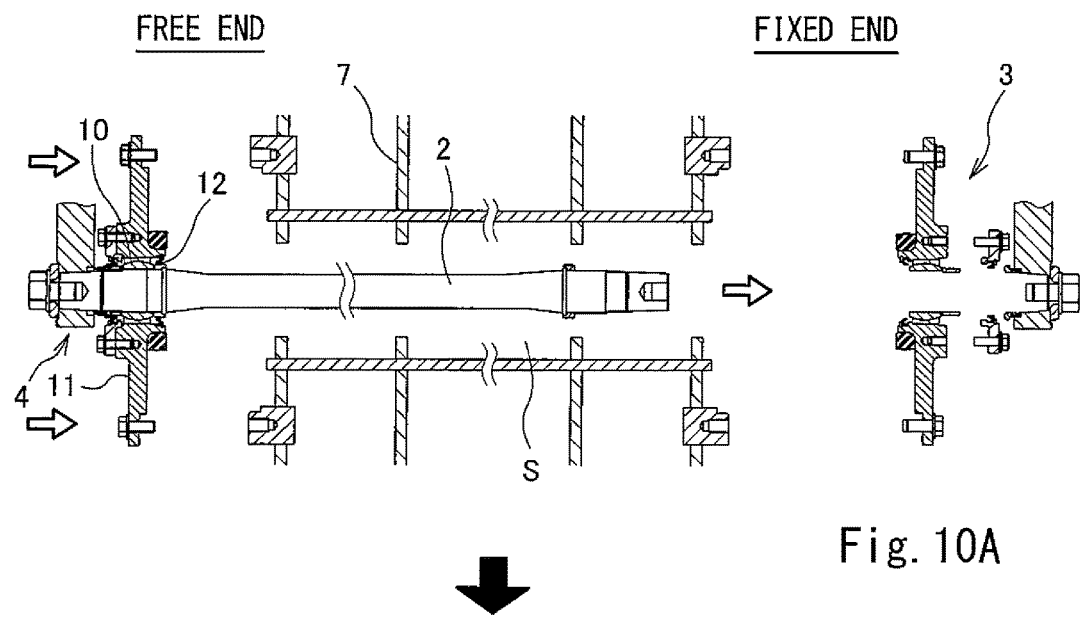
FIGS. 10A and 10B are cross-sectional views for explaining the work of attaching the anti-rolling device of the bogie of FIG. 9 from the free end side.
Figure 10B:
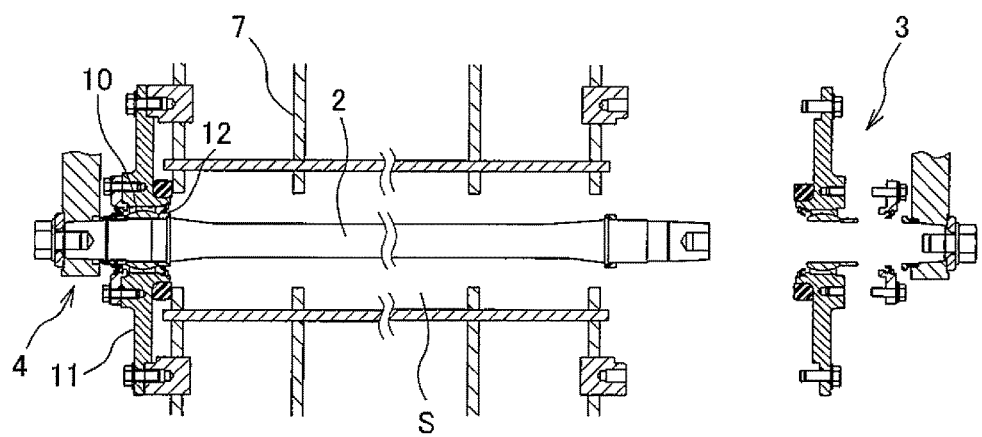
Figure 12A:
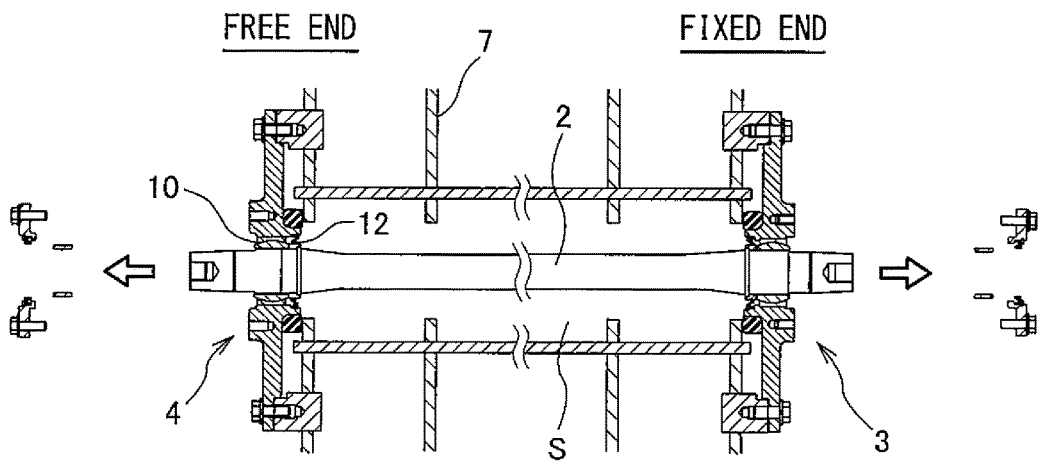
FIGS. 12A to 12C are cross-sectional views for explaining the work of detaching the anti-rolling device of the bogie of FIG. 9 from the fixed end side.
Figure 12B:
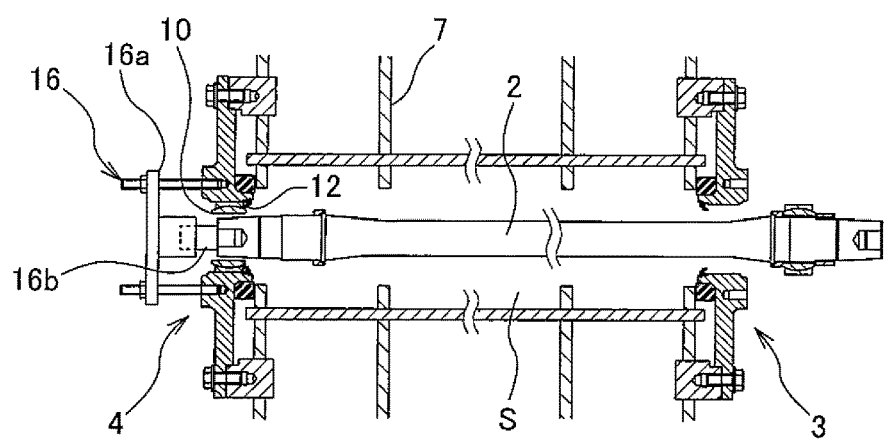
Figure 12C:
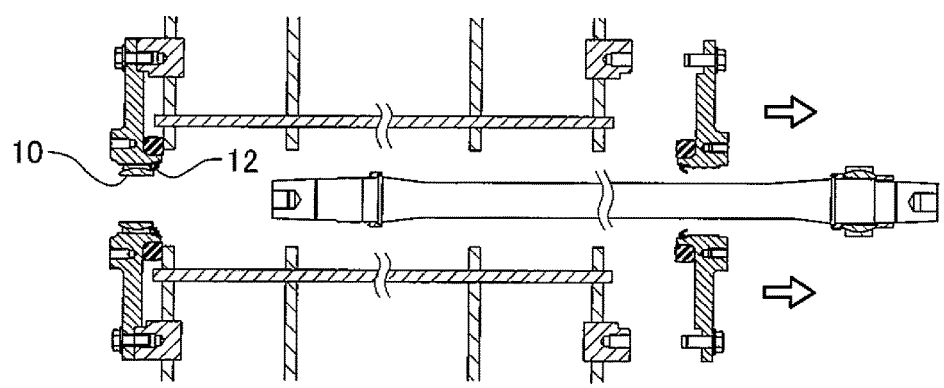

FIG. 8 is a major component side view schematically showing a railcar 120 equipped with the anti-rolling device 40 of Embodiment 2. The same reference signs are used for the same components as in Embodiment 1, and explanations thereof are omitted. As shown in FIG. 8, in the railcar 120 of Embodiment 2, each of both end portions of the torsion bar 41 is coupled to a bracket 146, provided at a bogie frame 124 of a bogie 122, through the first link mechanism 44 or the second link mechanism 45. Then, the torsion bar 41 is inserted in the width direction into the internal space formed at a frame 121a (fixed portion) of a floor portion of a carbody 121, and the first bearing device 42 and the second bearing device 43 are fixed to respective side surfaces of the frame 121a. It should be noted that the internal space into which the torsion bar is inserted is not limited to the internal space of the frame of the floor portion and may be formed at an underframe. As above, when viewed from the anti-rolling device 40, a connection relation between the carbody 121 and the bogie 122 in Embodiment 2 is opposite to that in Embodiment 1. The above configuration can also obtain the same effects as Embodiment 1. Since the other components are the same as those in Embodiment 1, explanations thereof are omitted.

The present invention is not limited to the above embodiments, and modifications, additions, and eliminations may be made within the scope of the present invention.

INDUSTRIAL APPLICABILITY

The anti-rolling device of the railcar according to the present invention has the above excellent effects. Therefore, it is useful to widely apply the present invention to railcars that can achieve the significance of these effects.

REFERENCE SIGNS LIST 20, 120 railcar (train set)
21, 121 carbody
22, 122 bogie
24 bogie frame
40 anti-rolling device
41 torsion bar
41a, 41b end portion
41c, 41d supported portion
42 first bearing device
43 second bearing device
44 first link mechanism
44a horizontal lever
44b vertical lever
45 second link mechanism
45a horizontal lever
45b vertical lever
48 first bearing casing
49 first spherical bearing
50, 51 first oil sealing member
68 second bearing casing
69 second spherical bearing
70, 71 second oil sealing member
77a small-diameter inner peripheral surface
77b large-diameter inner peripheral surface
77c, 78b protruding portion
121a frame
S internal space

The invention claimed is:

1. An anti-rolling device of a railcar,
the anti-rolling device comprising:
a torsion bar extending in a width direction of a carbody and including both end portions coupled through respective levers to a first attachment target that is one of the carbody or a bogie, the torsion bar being inserted into an internal space formed at a second attachment target that is the other of the carbody and the bogie;
a first bearing device including
a first bearing casing provided at a first end side of the torsion bar and fixed to a portion of the second attachment target, the portion being located at an outer side in the width direction,
a first bearing accommodated in the first bearing casing and rotatably supporting a first end-side supported portion of the torsion bar, and
a pair of first oil sealing members arranged so as to be spaced apart from the first bearing in an axial direction; and
a second bearing device including
a second bearing casing provided at a second end side of the torsion bar and fixed to a portion of the first attachment target, the portion being located at the outer side in the width direction, a second bearing accommodated in the second bearing casing and rotatably supporting a second end-side supported portion of the torsion bar, and a pair of second oil sealing members arranged so as to be spaced apart from the second bearing in the axial direction, wherein:

the first bearing casing accommodates the first bearing while restricting a displacement of the first bearing in the axial direction;

the second bearing casing accommodates the second bearing while allowing a displacement of the second bearing in the axial direction; and the second bearing casing includes a protruding portion interposed between each of the pair of second oil sealing members and the second bearing so as to be spaced apart from the second bearing in the axial direction.

2. The anti-rolling device according to claim 1, wherein:
the second bearing casing further includes
a small-diameter inner peripheral surface contacting an outer ring of the second bearing and
a large-diameter inner peripheral surface contacting any one of the pair of second oil sealing members;
a radially outer end portion of the second oil sealing member contacting the large-diameter inner peripheral surface is located at a radially outer side of the outer ring of the second bearing; and
the protruding portion is located at a portion of the small-diameter inner peripheral surface and projects toward a radially inner side from the small-diameter inner peripheral surface, the portion being close to the large-diameter inner peripheral surface.

3. The anti-rolling device according to claim 2, wherein each of the first bearing device and the second bearing device is fixed to the second attachment target so as to close the internal space from an outside in the width direction.

4. The anti-rolling device according to claim 1, wherein each of the first bearing device and the second bearing device is fixed to the second attachment target so as to close the internal space from an outside in the width direction.

* * * * *